(12) United States Patent
Miller

(10) Patent No.: US 6,269,273 B1
(45) Date of Patent: Jul. 31, 2001

(54) DELIVERING MULTIPLE OPTICAL SIGNALS USING LIGHT THAT DOES NOT CARRY THE DATA

(75) Inventor: Joseph P. Miller, Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/098,077

(22) Filed: Jun. 16, 1998

Related U.S. Application Data

(62) Division of application No. 08/905,813, filed on Jul. 31, 1997, now Pat. No. 5,809,186, which is a continuation of application No. 08/669,944, filed on Jun. 25, 1996, now abandoned.

(51) Int. Cl.$^7$ ................................................. G05B 11/01
(52) U.S. Cl. ........................... 700/19; 385/14; 385/16; 385/31; 385/50
(58) Field of Search ................................ 385/14, 31, 50, 385/16, 24, 17, 19, 20

(56) References Cited

U.S. PATENT DOCUMENTS

| 5,186,865 | * | 2/1993 | Wu et al. | 252/582 |
| 5,233,673 | * | 8/1993 | Vali et al. | 385/16 |
| 5,568,575 | * | 10/1996 | Sato | 385/16 |

OTHER PUBLICATIONS

D. Bursky, Motorola Semiconductor Inc.'s Optobus, Nov. 21, 1994, Electronic Design, Penton Publishing Inc.*
J. Defar, Motorola Position Interfernece Scheme (product announcement); Nov. 28, 1994, Electronic News, Electronic New Publishing Corp.*
J. Grula & G. Raskin, Designing Computers; Aug. 28, 1995; Electronic Engineering Times, CMP Publications, Inc.*
Coming: Faster, Cheaper Optical Data Links, Feb. 1, 1996, BYTE McGraw–Hill, Inc.*
L. Wirbel, Motorola MCMs Deliver 1.5 GBITS/S; Nov. 28, 1994, Electronic Engineering Times, CMP Publishers, Inc.*
M. Lebby et al., Characteristics of VCSEL Arrays for Parallel Optical Interconnecters, May 1996, IEEE.*
J. Grula & A. Gunther, Parallel Optical Data Transmission With Optics; Mar. 1996, Elektronik Industrie.*
M. Lebby, et al, Use of VCSEL Arrays for Parallel Optical Interconnects; 1996, Proceedings of the SPIE.*
P. De Vittor, An Optical Paralell Link for 1.5 Gbit/s; May 1995, Elettronica Oggi.*
D. Bursky, Parallel Optical Links Move Data at 3 Gbit/s; Nov. 1994, Electronic Design.*

* cited by examiner

Primary Examiner—William Grant
Assistant Examiner—Edward F. Gain
(74) Attorney, Agent, or Firm—Conley, Rose & Tayon, P.C.

(57) ABSTRACT

Electrical signals are received corresponding to sets of digital data, and output optical signals are delivered, corresponding to the digital data, on at least two optical channels corresponding to different sets of the digital data, using light from a single light source. In another scheme, the optical switch may be integrated with an optical transmission medium (e.g., an optical cable).

20 Claims, 4 Drawing Sheets

DELIVERING MULTIPLE OPTICAL SIGNALS USING LIGHT THAT DOES NOT CARRY THE DATA

This application is a divisional of U.S. application 08/905,813, filed Jul. 31, 1997, now U.S. Pat. No. 5,809,186, which in turn is a continuation of U.S. application Ser. No. 08/669,944, filed on Jun. 25, 1996, now abandoned.

BACKGROUND

This invention relates to optical-signal processing.

Systems for optical-signal processing, such as Motorola's OPTOBUS™ link, send bit streams (e.g., channels of information) encoded as light pulses from one computer to another in a multiplexed fashion. The OPTOBUS™ link includes two integrated circuits for, respectively, sending and receiving multiplexed light pulses. The first integrated circuit has ten laser diodes which receive bit streams from the first computer and emit corresponding streams of light pulses. The light pulses pass through an optical cable to the second integrated circuit, which contains ten light detectors for converting the light pulses into a series of demultiplexed bit streams.

SUMMARY

In general, in one aspect, the invention features receiving, on a single integrated circuit, electrical signals corresponding to sets of digital data, and, on the same integrated circuit, delivering output optical signals, corresponding to the digital data, on at least two optical channels corresponding to different sets of the digital data, using light from a single light source.

Implementations of the invention may include one or more of the following. The electrical signals may represent separate sets of the digital data which then may be carried on corresponding sets of the optical channels. The output optical signals may be delivered by an optical processor that includes an optical switch for switching light from the single light source to the optical channels selectively. The optical channels may include waveguides that receive light switched from the single light source, which may deliver light continuously. The waveguides may be formed in a polymeric substrate, including a material that undergoes capacitively induced changes in index of refraction. The single light source may include a source waveguide and a diode. Each of the optical channels may include an end adjacent and parallel to the single light source for receiving the switched light. The optical switch may include an electro-optical switching device that receives electrical control signals corresponding to the digital data and causes corresponding optical switching from the single light source to the optical channels. The electro-optical switching device may include plates of a capacitor adjacent a region in which the first end of each of the optical channels is in close proximity to the single light source. The control circuitry may be formed on the integrated circuit.

The optical processor may include at least ten optical channels, or any number of channels limited by the size of the integrated circuit, the driving power, and the optical source power. The single light source may also be formed on the integrated circuit. An optical transmission medium (e.g., a multiple fiber optical ribbon cable) may be coupled to outputs of the optical channels.

In another aspect, the invention features forming at least a portion of the single light source and the control circuitry on a single integrated circuit, and integrating the optical switch with the optical transmission medium.

In another aspect, the invention features an optical transmission cable having an input optical waveguide extending from an input end of cable for connection to a source of light; separate output optical waveguides extending along the length of the cable from the input optical waveguide to an output end of the cable; and an optical switch for switching light from the input optical waveguide selectively to the output optical waveguides; the input and output waveguides and the optical switch are configured to form a freestanding cable.

In other aspects, the invention includes a computer having a CPU, a memory, peripheral devices, and either the optical device for use with signals being processed in the computer, or the optical transmission cable.

Among the advantages of the invention may be one or more of the following. The optical signal transmitter need include only a single light source, and may therefore be relatively easy and inexpensive to make. The transmitter's switching device can switch light from the single laser into a large number (e.g., greater than 10) of waveguides.

Other advantages and features of the invention will be apparent from the following description and from the claims.

DESCRIPTION

Figure 1:
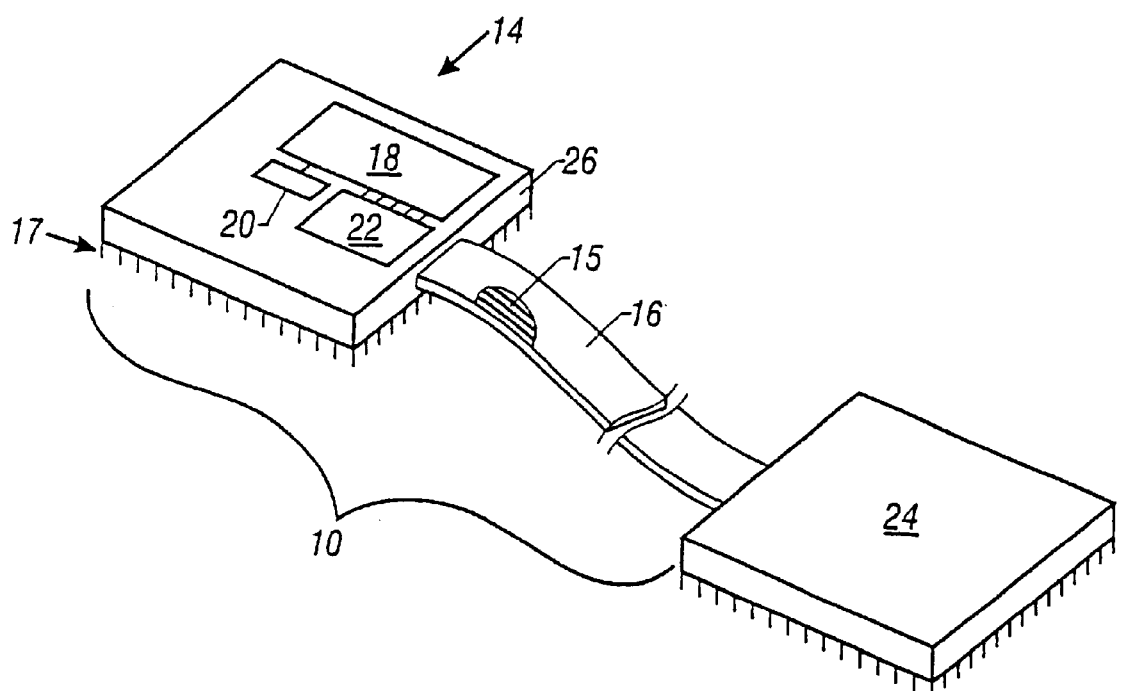
FIG. 1 is a perspective view of an optical-signal transmitter.
Figure 3:
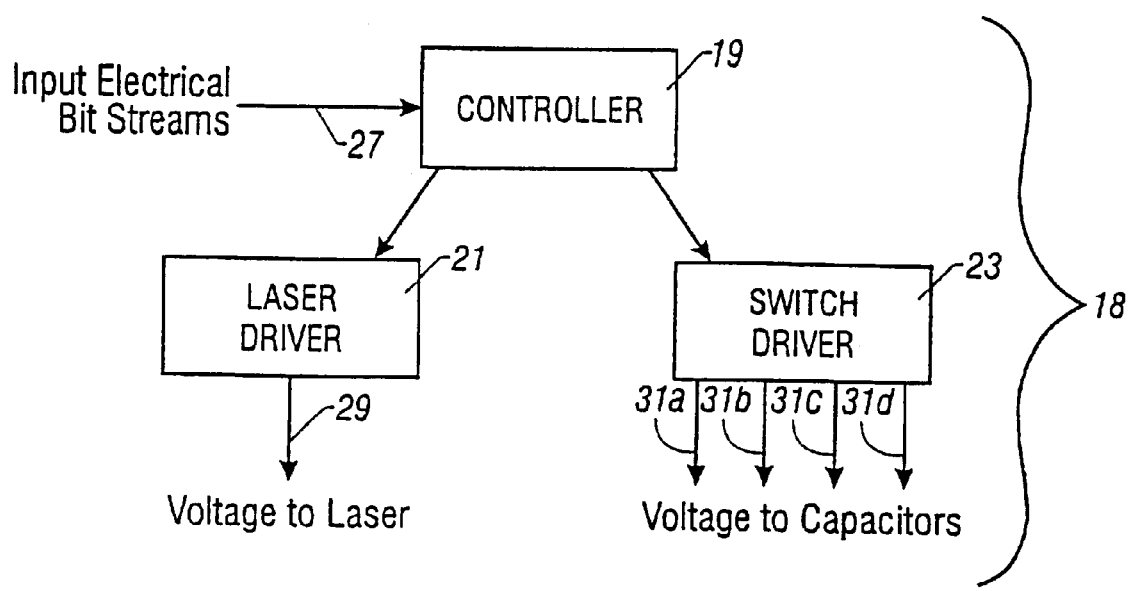
FIG. 3 is a block diagram of control circuitry.

In FIG. 1 an optical-signal transmitter 10 converts input bit streams carried as electrical signals into corresponding streams of light pulses. The transmitter 10 sends the streams of light pulses on respective fiber waveguides of a multiple-fiber optical ribbon cable 16 to an optical-signal receiver 24. The receiver 24 detects the light pulses and converts them into electrical signals representing a set of replica bit streams. The transmitter 10 and receiver 24 are used, for example, to send bit streams from one computer to another.

The transmitter 10 includes an integrated circuit 14 which connects at its front face 26 to the optical ribbon cable 16. The cable 16 contains multiple optical waveguides 15, each carrying one of the streams of light pulses to the receiver 24. The integrated circuit 14 receives input bit streams, for example, at respective conductor of an array 17 and processes the signals in a control circuit 18. The control circuit 18 processes the bit streams and controls a single diode laser light source 20 and an optical switching device 22. The last diode 20 emits "input" light into the optical switching device 22. The switching device 22 switches portions of the input light to generate a stream of "output" light pulses corresponding to the input bit streams. Separate streams of output light pulses leaving the front face 26 of the integrated circuit enter waveguides 15 in the optical ribbon cable 16, and propagate to the optical-signal receiver 24.

Figure 2A:
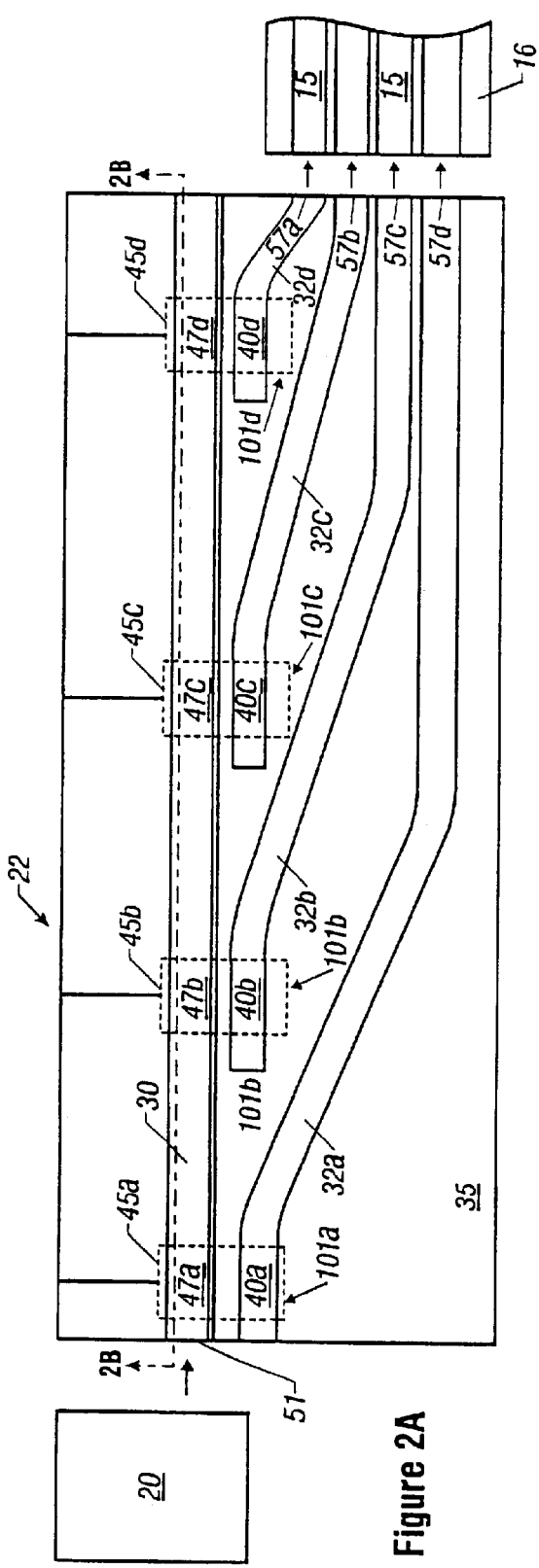
FIGS. 2A and 2B are, respectively, top and cross-sectional views (at 2B on FIG. 2A) of an optical switching device.
Figure 2B:
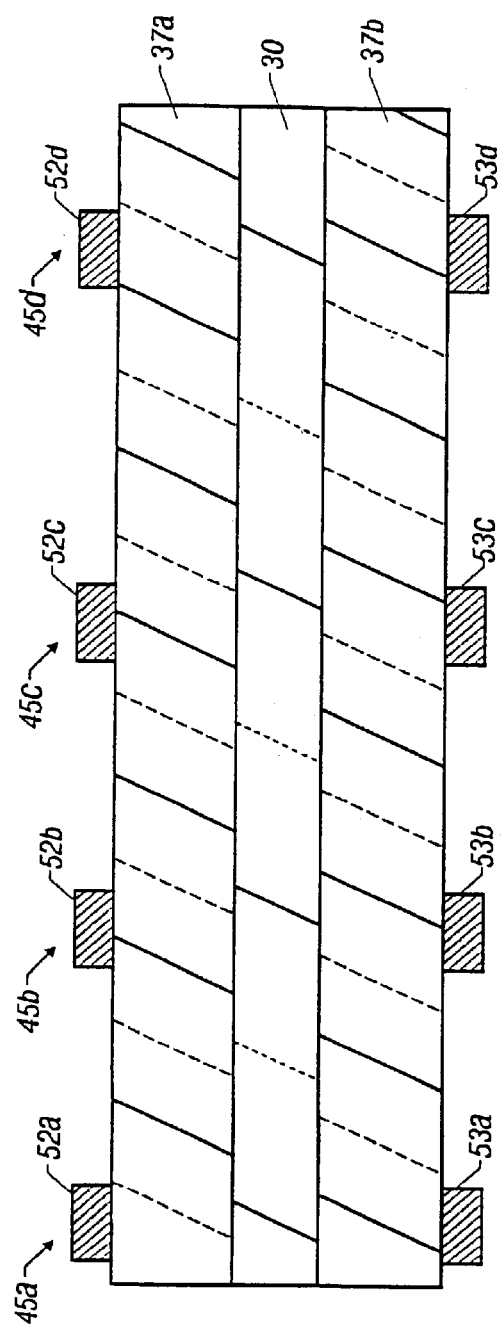
Figure 4A:
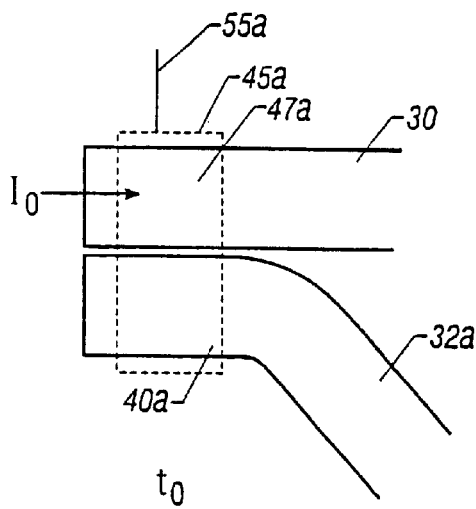
FIGS. 4A–4C are top views of a primary and secondary optical waveguide, respectively, prior to, during, and after a switching event.
Figure 4B:
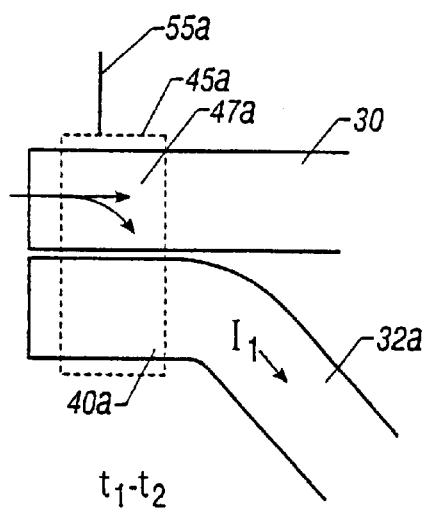
Figure 4C:
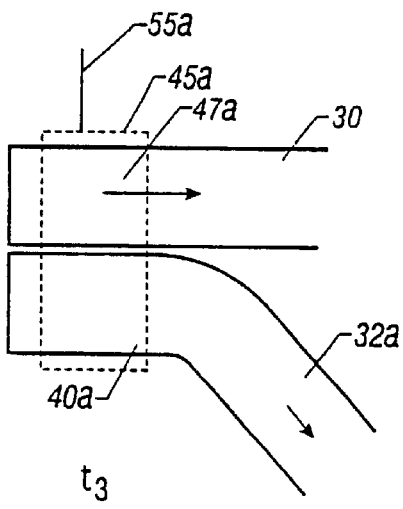

In the example of FIGS. 2A and 2B, the switching device 22 includes a single primary optical waveguide 30 and four secondary optical waveguides 32a–d formed in a polymer sheet 35. The primary optical waveguide 30 includes an input face 51 which receives continuous input light from the light source 20. Each secondary waveguide 32a–32d includes an input end 40a–40d which receives switched light from the primary waveguide and an exit face 57a–d which delivers streams of output light pulses into separate waveguides 15 within the ribbon cable 16. As shown in FIG. 2B, the switching device 22 also includes glass (or air or polymeric) layers 37a,b between which the polymer sheet 35 is sandwiched. The layers 37a–b have indices of refraction which are higher than of the polymer, and thus function as an optical fiber "cladding" which confines light within the waveguides.

Switching of light from the primary optical waveguide 30 into the secondary optical waveguides 32a–d occurs at switching regions 101a–101d. At each switching region 101a–d, the input end 40a–40d of one of the secondary optical waveguide is parallel with and adjacent to a corresponding portion 47a–47d of the primary optical waveguide. Each switching region is sandwiched between top 52a–d and bottom 53a–d plates of a capacitor 45a–d for applying an electric field to the polymer sheet 35 to effect the light switching.

FIGS. 3 and 4A–4C show how the control circuit 18, and optical switching device 22 switch output light pulses into each of the secondary optical waveguides. The control circuit 18 includes a controller 19, a laser driver 21, and a switch driver 23. The laser light source 20 continuously emits input light with a time-independent intensity $I_0$ in response to a voltage 29 from the laser driver 21. In response to the input electrical streams 27, controller 19 causes the switch driver to deliver sequences of voltage pulses 31a–d to the capacitors in the optical switching device. The capacitors 45a–d receive the respective sequences of voltage pulses 31a–d from the switch driver 23 and switch corresponding streams of output light pulses into the secondary waveguide.

Figure 5:
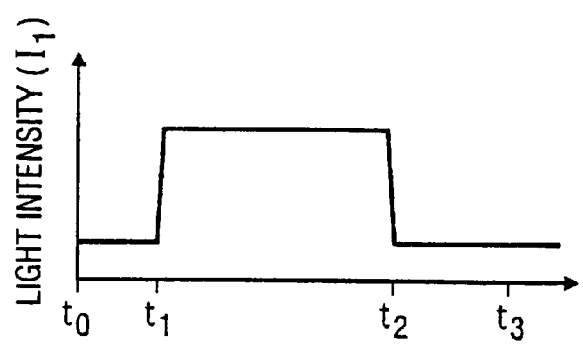
FIG. 5 is a plot of the time-dependent intensity of a light pulse within the secondary waveguide of FIG. 4C.

The switching is triggered by capacitively induced changes of the refractive index in the thin bridge of the polymer sheet 35 separating the portions 40a, 47a of the primary and secondary optical waveguides. The refractive index change switches an output light pulse of intensity $I_1$ into the secondary optical waveguide 32a during a time period $(t_1-t_2)$ that the voltage is applied. As seen in FIG. 5, $I_1$ has a square-wave profile and a duration of $t_1-t_2$. In general, the light pulses in each secondary waveguide will include a series of square waves corresponding to an input electrical bit stream.

U.S. Pat. No. 5,186,865 "Electro-optical Materials and Light Modulating Devices Containing the Same", incorporated herein by reference, describes a polymer sheet for the switching device. Optical waveguides are fabricated in the polymer sheet using known masking techniques and ultraviolet optical radiation. The polymer exhibits a voltage-dependent refractive index change.

Figure 6:
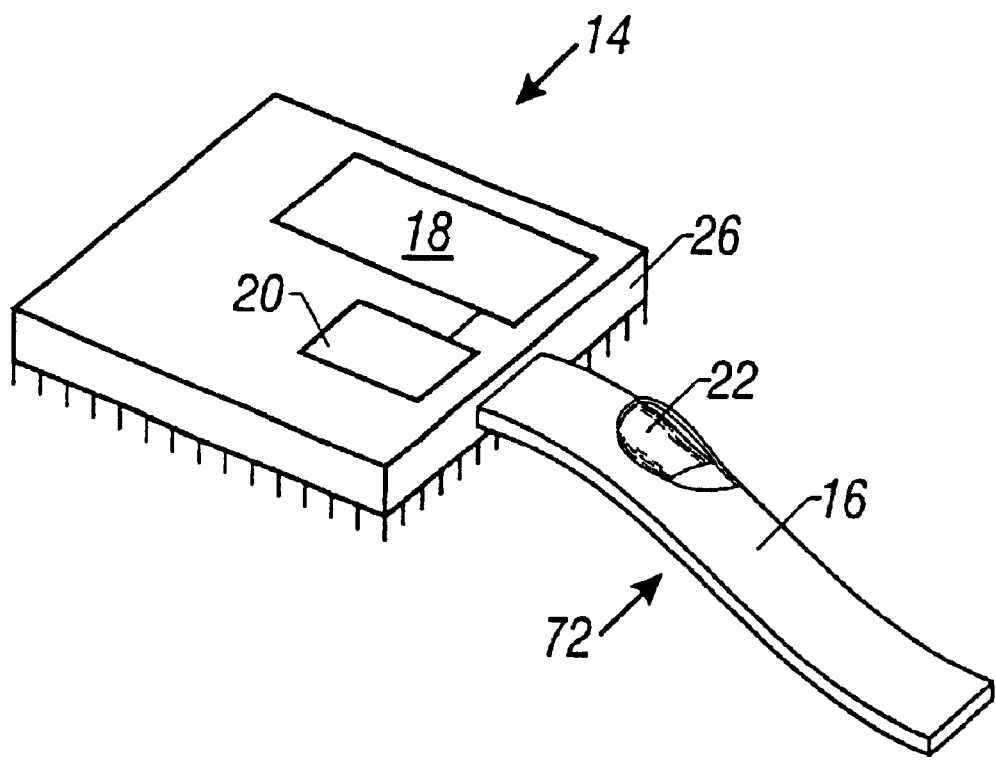
FIG. 6 is a perspective view of an another-optical-signal transmitter.

Other embodiments are within the scope of the following claims. For example, fewer or more (even many more) secondary waveguides and capacitors may be included in the switching device. The integrated circuit may also include multiple laser diodes, at least one of which is connected to an optical switching device. The optical-signal transmitter may use other methods for switching light from one waveguide to another, such as modulation of the light's polarization. As seen in FIG. 6, the switching device 22 may be integrated with the optical ribbon cable 16 to form a single cable 72 attached to a front face 26 of the integrated circuit 14. Inside the cable 72 are electrical leads which supply voltage from the control circuit to the switching device. The optical function need not be on the same integrated circuit or other components, provided that they are part of a single packaged component, such as a package having a pin grid array. The laser diode 20 may be integrated with the laser driver 21 or formed separately depending on the cost of fabrication.

What is claimed is:

1. A computer comprising:
   (a) a CPU and a memory device on a motherboard,
   (b) a peripheral device, and
   (c) a device for use with signals being processed in the computer, the device comprising:
      (1) an input for receiving electrical signals corresponding to sets of digital data,
      (2) a light source, the output of which does not carry the digital data, and
      (3) an optical processor for delivering output optical signals, corresponding to the digital data, on at least two optical channels corresponding to different sets of the digital data, using light from the light source,
      (4) the input and the optical processor being formed on a single integrated circuit.

2. The computer of claim 1 in which the electrical signals represent separate sets of the digital data, and the separate sets of digital data are carried on corresponding ones of the optical channels.

3. The computer of claim 1 in which the optical processor includes an optical switch for switching light from the light source to the optical channels selectively.

4. The computer of claim 3 in which the optical channels comprise waveguides that receive light switched from the light source.

5. The computer of claim 4 in which the waveguides are formed in a polymeric substrate.

6. The computer of claim 5 in which the substrate comprises a material that undergoes capacitively induced changes in index of refraction.

7. The computer of claim 4 in which each of the waveguides has an end adjacent and parallel to the light source for receiving the switch light.

8. The computer of claim 3 in which the optical switch includes an electro-optical switching device that receives electrical control signals corresponding to the digital data and causes corresponding optical switching from the light source to the optical channels.

9. The computer of claim 8 in which the electro-optical switching device comprises plates of a capacitor adjacent a region in which the first end of each of the optical channels is in close proximity to the light source.

10. The computer of claim 8 in which the electro-optical switching device includes control circuitry.

11. The computer of claim 10 in which the control circuitry is formed on the integrated circuit.

12. The computer of claim 10 in which the optical transmission medium comprises a multiple fiber optical ribbon cable.

13. The computer of claim 3 in which the optical switch is not formed on the integrated circuit.

14. The computer of claim 1 in which the light source delivers light continuously.

15. The computer of claim 1 in which the light source comprises a source waveguide.

16. The computer of claim 1 in which the light source comprises a diode.

17. The computer of claim 1 further comprising an optical transmission medium coupled to outputs of said optical channels.

18. The computer of claim 1 in which the optical processor comprises at least ten optical channels.

19. The computer of claim 1 in which the light source is also formed on the integrated circuit.

20. A computer comprising:
 (a) a CPU and a memory device on a motherboard,
 (b) a peripheral device, and
 (c) an optical transmission cable having:
  (1) only a single input optical waveguide extending from an input end of the cable to an output end of the cable,
  (2) multiple output optical waveguides extending along the length of the cable from the input optical waveguide to an output end of the cable, and
  (3) an optical switch for switching light from the input optical waveguide selectively to the output optical waveguides,
  (4) the input and output waveguides and the optical switch configured to form a freestanding cable.

* * * * *